April 3, 1928.  
W. C. SLEEMAN  
RAILROAD CAR TRUCK  
Filed Nov. 12, 1926  
1,664,795  
2 Sheets-Sheet 1

Inventor  
WILLIAM C. SLEEMAN.  
By His Attorney

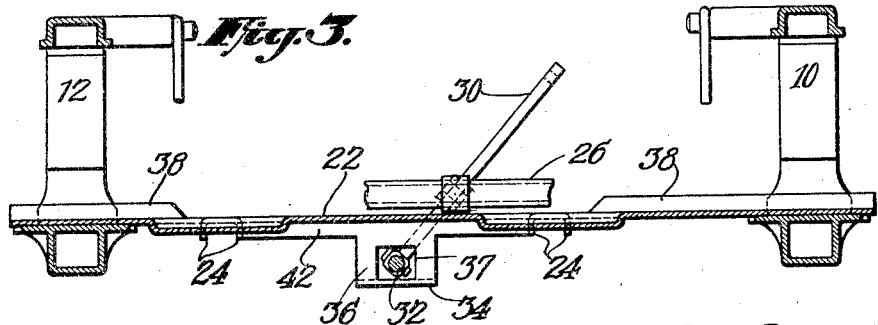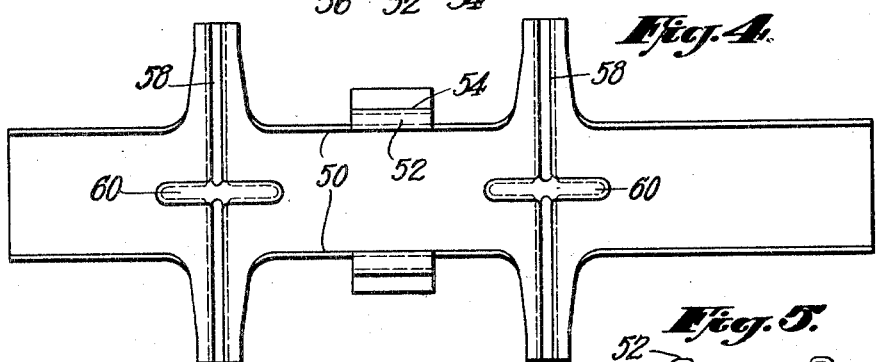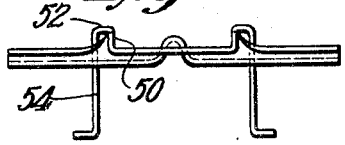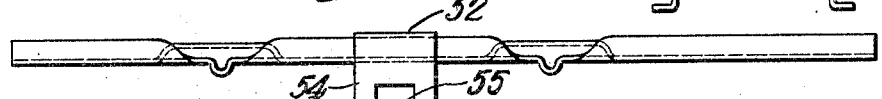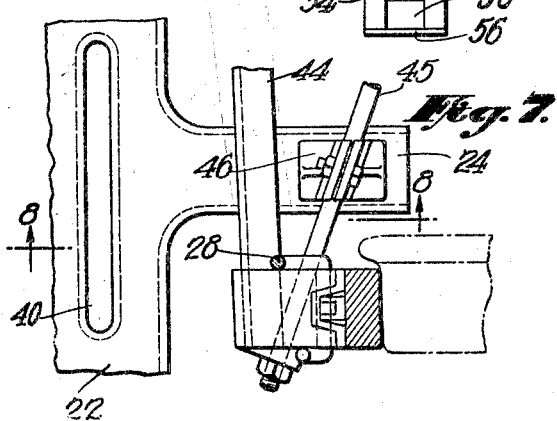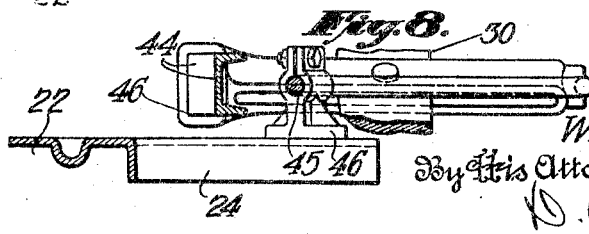

Patented Apr. 3, 1928.

1,664,795

UNITED STATES PATENT OFFICE.

WILLIAM C. SLEEMAN, OF BIRMINGHAM, ALABAMA.

RAILROAD-CAR TRUCK.

Application filed November 12, 1926. Serial No. 147,948.

This invention relates to improvements in railway car truck construction and aims particularly to provide a truck having a spring plank carrying improved safety means for the brake beam. In the trucks heretofore used, it has been almost universal practice to form the brake beam safety supports of separate pieces such as angle bars or flat bars riveted or bolted to the spring plank. Due to vibration and weaving of the trucks, it is practically impossible to keep the prior forms of safety supports securely fastened in place. My improved construction overcomes these difficulties and further possesses other advantages which will be apparent from the following specification when read in connection with the accompanying drawings. In the drawings—

Fig. 3 is a vertical section on line 3—3 of Fig. 2;

Fig. 4 is a detail view of a modified form of spring plank;

Fig. 5 is an end view thereof;

Fig. 6 is a side view of the spring plank illustrated in Figs. 4 and 5;

Fig. 7 is a detail view in top plan showing the brake beam provided with a bearing shoe adapted to slidingly engage the projection on the spring plank;

Fig. 8 is a sectional view on line 8—8 of Fig. 7;

Fig. 9 is a view similar to Fig. 8 showing a slight modification thereof.

Referring in detail to the drawings, 10 and 12 represent side frames of the car truck which are provided with journal boxes 14 of any suitable design for accommodation of the journal portions of the track wheel axles 16.

The side frames are each provided with column portions 18 spaced symmetrically about the center line of the truck, said column portions defining the outline of an opening 20 which is provided for the accommodation of any usual or suitable springs and bolster for carrying the car body.

Figure 1:
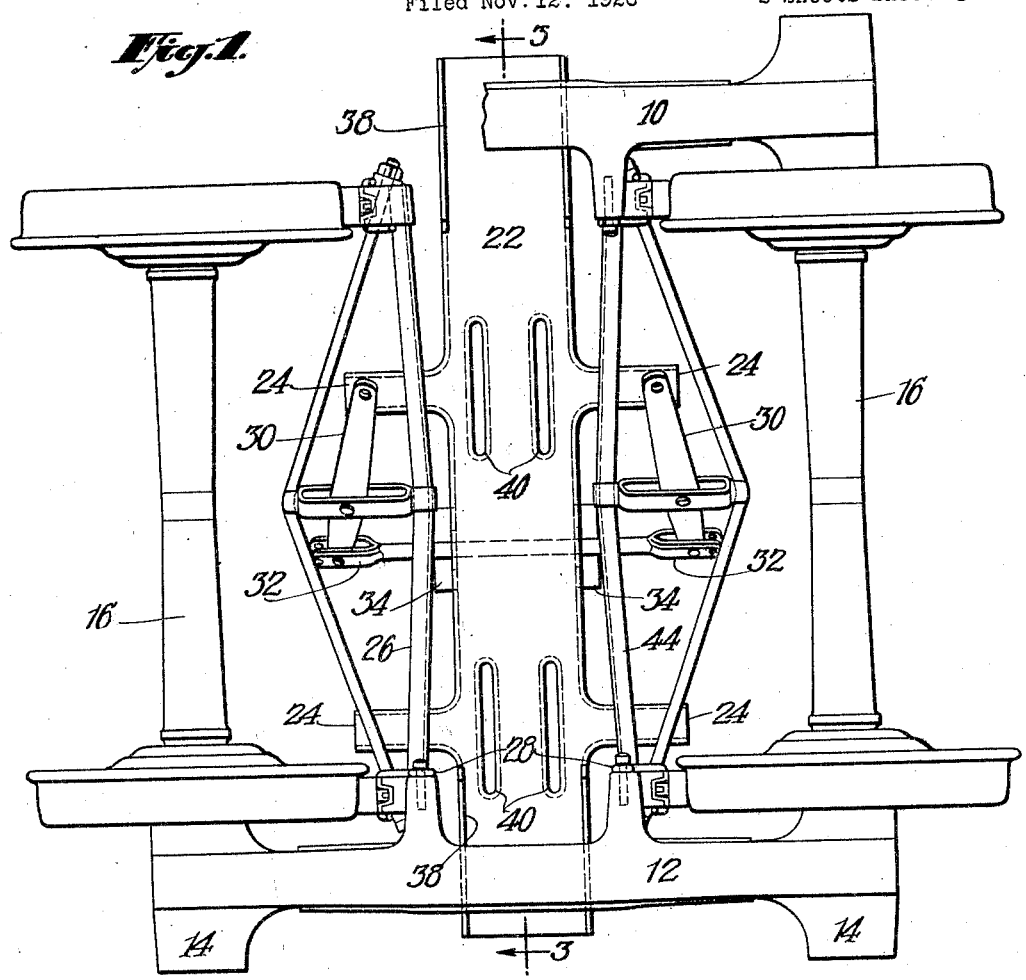
Fig. 1 is a plan thereof with parts broken away in the interest of clearness.
Figure 2:
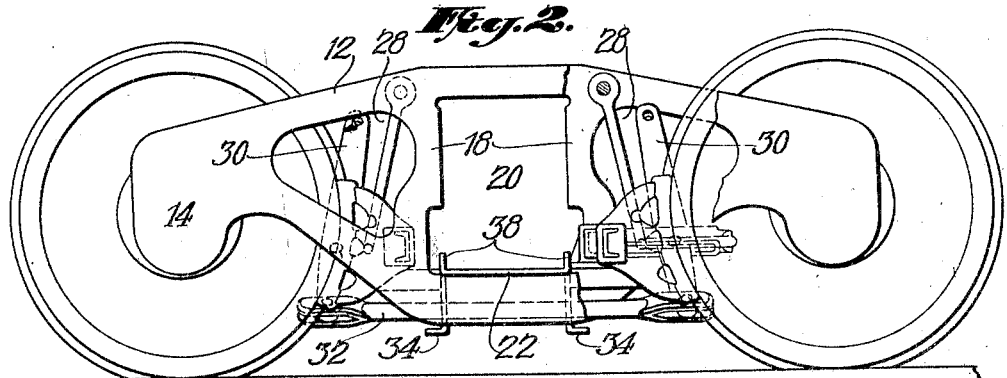
Fig. 2 is a side elevation of a car truck embodying my invention.

Extending transversely of the truck and projecting through the spring openings 20, I provide a spring plank indicated as a whole at 22. This spring plank is provided with a plurality of integral extensions 24 which are adapted to form a safety support in case the brake beams 26 drop because of failure of the brake beam hangers 28 or other part of the brake rigging. In the brake rigging illustrated the beams carry operating levers 30 which are connected to one another by a bottom rod 32. My improved spring plank is also provided with safety supports 34 which are adapted to prevent this bottom rod from falling should any of the connections thereof fail. In the embodiment of the invention illustrated in Figs. 1 to 3 inclusive, the safety supports 34 are formed by providing downwardly bent extensions or webs 36 which are apertured at 37 to permit the bottom rod 32 to pass therethrough. Each web 36 is bent at right angles to form shelf-like supports 34. To reinforce or stiffen the spring plank, I preferably form it with upturned flanges 38 near each end. I also provide outwardly pressed ribs 40 to reinforce the horizontal web of the spring plank. To stiffen or rigidify the spring plank near the center, I provide integral down turned flanges 42 which merge into the web 36 forming part of the bottom rod safety support. In the embodiment of the invention illustrated in Fig. 7, the brake beam has secured to the tension member 45 thereof shoes 46 which slidingly engage the integral extensions formed on the spring plank. As an alternative for this sliding shoe arrangement, I also propose to provide a brake beam with a roller 48 carried by a bracket 49 secured to the tension rod as shown in Fig. 9, the roller having a bearing on the safety extensions 24 formed on the spring plank.

Figs. 4, 5 and 6 illustrate a slightly modified form of spring plank in which the center flanges 50 thereof are upturned. In this form of spring plank the bottom rod support comprises a portion 52 extending outwardly from flange 50, the downwardly extending web 54 having an opening 55 therein, the lower portion of the web 54 being bent outwardly to form sort of a shelf-like support 56 similar to the shelf 34 of Fig. 1. In this form of spring plank, the safety extensions are provided with reinforcing ribs 58 which are offset downwardly from the upper surface of the spring plank and which at the center merge into upwardly projecting ribs 60 formed in the top plate portion of the spring plank.

While I have described with great particularity a specific design and arrangement of certain particular embodiments of the invention illustrated, it is not to be construed that I am limited thereto since various modifications and substitution of equivalents may be made by those skilled in the art without departing from the invention as defined in the appended claims.

What I claim is:—

1. A car truck including spaced side frames, a pressed metal spring plank extending transversely between said frames and brake beam safety supports pressed integrally with said spring plank.

2. A car truck including spaced side frames, a pressed metal spring plank extending transversely between said frames, brake beams carrying levers by a bottom rod, and safety supports for said rod pressed integrally with said spring plank.

3. The car truck of claim 2 with the additional feature of integrally pressed brake beam supports.

4. A car truck including spaced side frames, a pressed metal spring plank extending transversely between said frames, a brake beam carrying a lever connected to a bottom rod, said spring plank having downwardly pressed flanges apertured to accommodate said bottom rod.

5. A car truck including spaced side frames, a pressed metal spring plank extending transversely between said frames and brake beam safety supports pressed integrally on both sides of said spring plank.

6. A car truck including a brake beam, and having a spring plank pressed from a sheet of metal with integral extensions of sufficient length to extend under said brake beams.

In witness whereof, I have hereunto signed my name.

WILLIAM C. SLEEMAN.